United States Patent [19]

Anderson et al.

[11] Patent Number: 4,750,357
[45] Date of Patent: Jun. 14, 1988

[54] THERMOCOUPLE PROBE AND METHOD FOR MEASURING FLUID FLOW RATES

[75] Inventors: David H. Anderson, Woodstown; Frederick J. Krambeck; Mou-neng M. Lo, both of Cherry Hill; Ajit V. Sapre, West Berlin, all of N.J.

[73] Assignee: Mobil Oil Corporation, New York, N.Y.

[21] Appl. No.: 839,240

[22] Filed: Mar. 13, 1986

[51] Int. Cl.⁴ .............................................. G01F 1/68
[52] U.S. Cl. ........................................ 73/195; 73/204
[58] Field of Search ................... 73/204, 195, 861.66; 374/54

[56] References Cited

U.S. PATENT DOCUMENTS

| | | | |
|---|---|---|---|
| 1,645,449 | 10/1927 | Proebstel | 73/861.66 |
| 1,766,149 | 6/1930 | Sawyer | 73/204 |
| 1,996,943 | 4/1935 | Wile | 73/204 |
| 3,071,520 | 1/1963 | Smalling | 73/204 |
| 3,691,832 | 9/1972 | Martin et al. | 73/204 |
| 3,979,954 | 9/1976 | Ide et al. | 73/861.24 |
| 4,039,430 | 8/1977 | Jensen | |
| 4,220,039 | 9/1980 | Taylor | 73/204 |

OTHER PUBLICATIONS

Ali "Hot-wire Anemometry in moderately heated flow" in Rev Sci Inst. vol. 46 #2 2/75 pp. 185–191.
Larkins, et al., "Two-Phase Concurrent Flow in Packed Beds", A. I. Ch. E. Journal, vol. 7, No. 2, pp. 231–241 (Jun., 1961).

Primary Examiner—Herbert Goldstein
Attorney, Agent, or Firm—Alexander J. McKillop; Michael G. Gilman; Charles J. Speciale

[57] ABSTRACT

A method for measuring local fluid flow rates in a vessel, e.g., a packed bed two-phase flow catalytic reactor, is disclosed which comprises:

(a) arranging a plurality of heated thermocouple probes in the vessel at predetermined locations in the path of the fluid flow therethrough;

(b) obtaining a first set of temperature readings with the probe heaters off to provide the local reactor temperature;

(c) obtaining a second set of temperature readings with the probe heaters on to provide the skin temperature of the heater well;

(d) using the difference between readings (b) and (c) to calculate the fluid flow rates.

10 Claims, 6 Drawing Sheets

PROBE RESPONSE FOR RUN NO.6

LEGEND:
THERMAL FLUX = ·······
TEMP. °F = — — —
AV. THERM. FLUX = ———

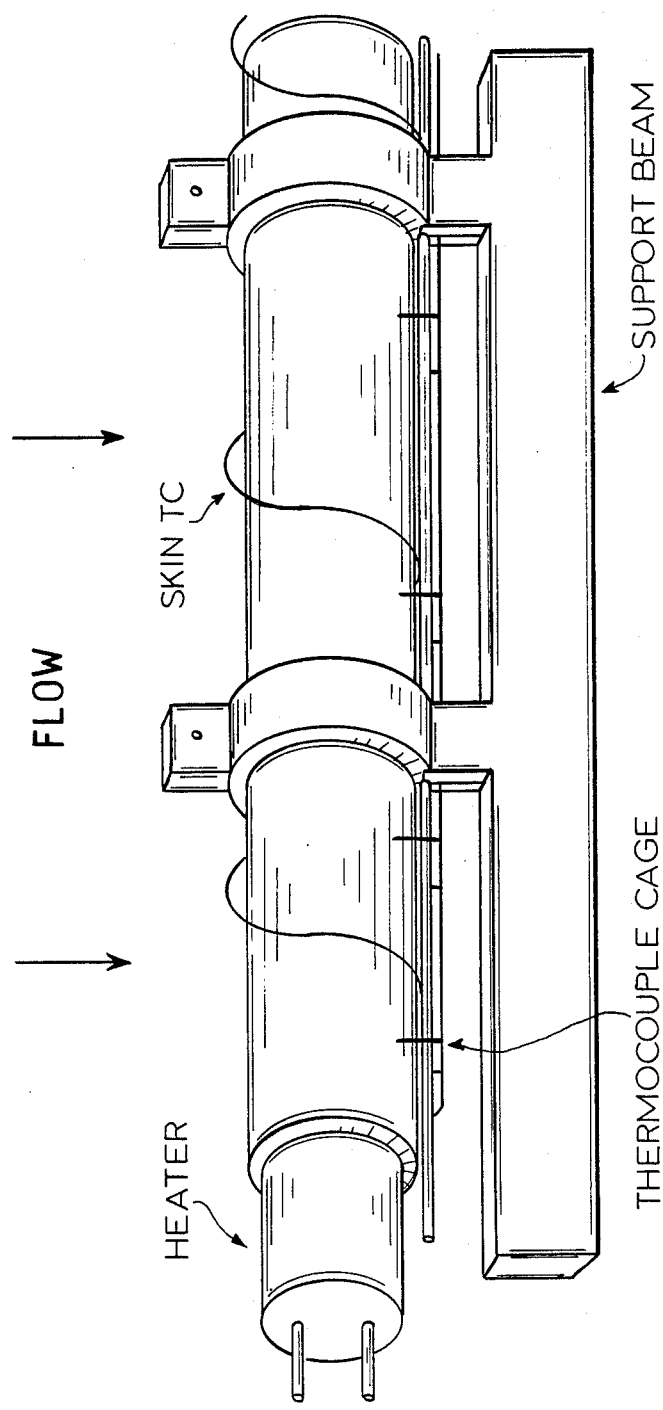

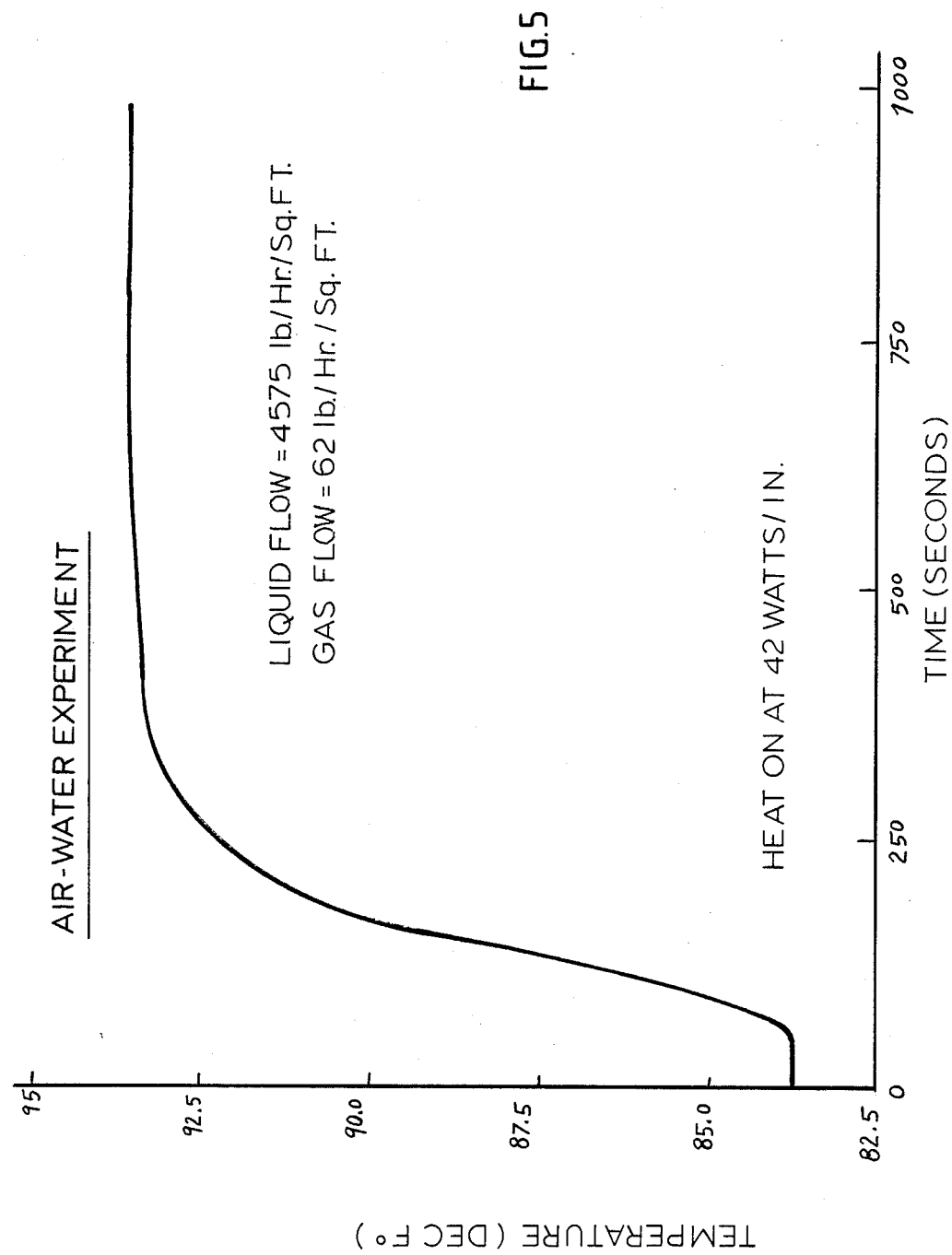

THERMOCOUPLE PROBE AND METHOD FOR MEASURING FLUID FLOW RATES

BACKGROUND OF THE INVENTION

This invention relates to the field of devices and methods for measuring fluid flow rates. More particularly, the invention provides a heated thermocouple probe for measuring fluid flow rates in a variety of processing equipment used in effecting a chemical and/or physical change in a feed stream, e.g., single phase or two phase flow reactors featuring concurrent, countercurrent, upflow or downflow passage of fluid streams, distillation, extraction and separator units, absorbers, desorbers, etc.

Obtaining uniform flow of fluid streams within predetermined limits is an important consideration in the design of chemical processing equipment, e.g., packed bed two-phase flow reactors. Reactors of this general type are well known and are widely employed for a variety of chemical conversions such as hydrotreating, hydrocracking, dewaxing, etc., of a hydrocarbon feed. As noted in U.S. Pat. No. 4,039,430, the efficacy of a chemical reaction is dependent on the degree of uniformity of the fluid flow profile as it passes through the catalyst bed. In optimizing the design of apparatus where uniform fluid flow is desirable, e.g., the aforementioned packed bed two-phase flow reactor, it is very helpful to have an accurate understanding of the thermal mass flux conditions which prevail at various locations within the reactor.

SUMMARY OF THE INVENTION

In accordance with the present invention, a method for measuring fluid flow rates in a confined zone is provided. The device comprises a heated thermocouple probe associated with one or more zones of a vessel, e.g., a two-phase flow reactor, where measurement of the fluid flow rates is desired. In the case of such a reactor, the probe contains two temperature measurements, the first with the probe heater off to provide the local temperature and the second with the probe heater on to provide the skin temperature of the heater well.

The difference between the foregoing first and second temperature measurements represents the local cooling effect which is a function of total thermal mass flux, i.e., the sum of the gas and liquid flow rates weighted by their heat capacities. The probe, therefore, directly measures the thermal mass flux in the zone of the vessel where it is installed. The thermal mass flux measurement can be used to calculate both gas and liquid rates using local pressure gradients as hereinafter more fully described.

BRIEF DESCRIPTION OF THE DRAWINGS

FIG. 3 is a simplified schematic perspective view of a section of an unmounted heated thermocouple probe such as installed in the reactor of FIG. 2;

FIG. 5 represents a response curve for local temperature measurements within a bench scale CHD reactor unit obtained with a single point heated thermocouple probe with the probe heater on and off;

DESCRIPTION OF THE PREFERRED EMBODIMENTS

Figure 1:
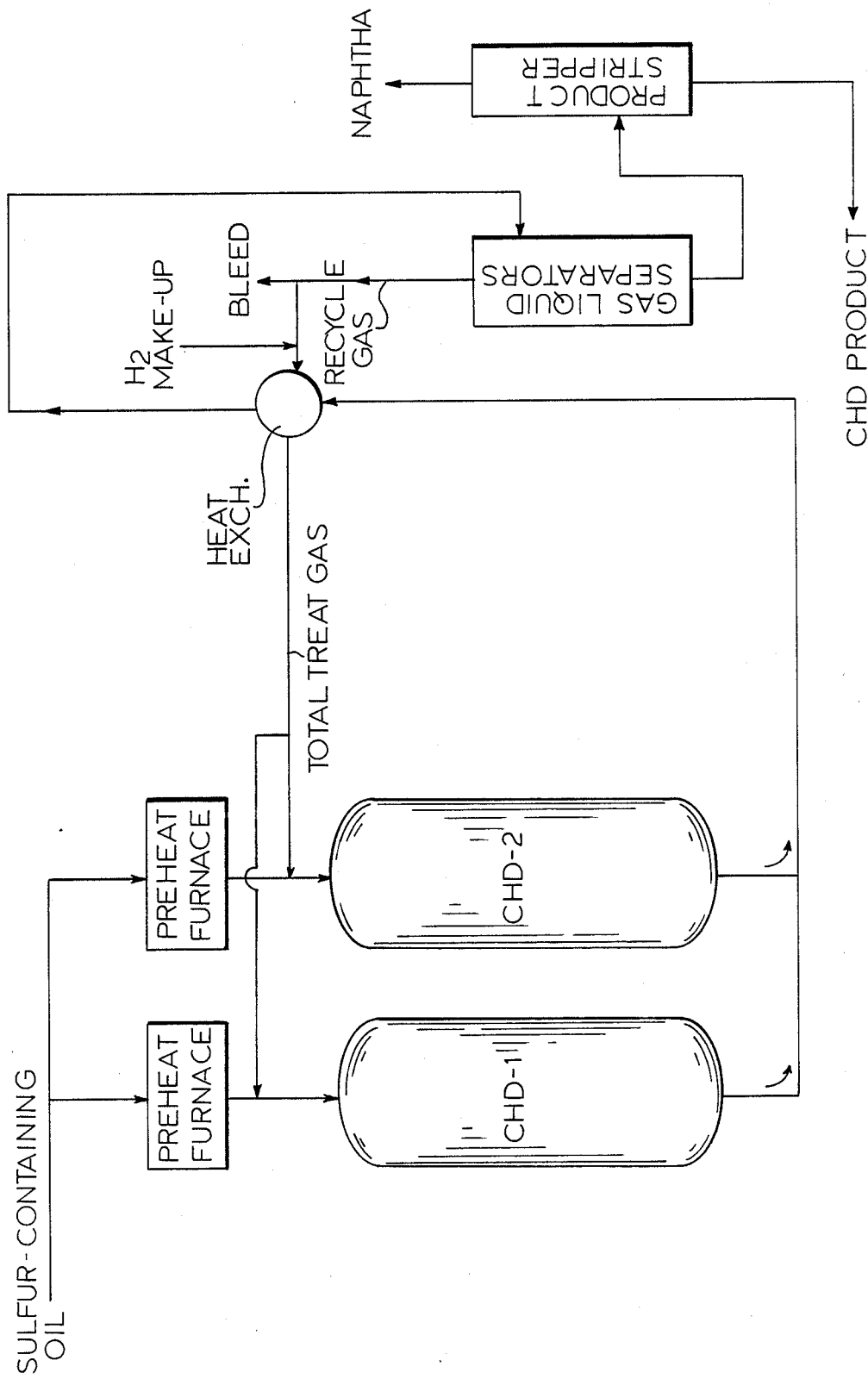
FIG. 1 is a schematic flow-diagram of a catalytic hydrodesulfurization (CHD) unit featuring a pair of fixed bed, two-phase flow reactors arranged in parallel.

In the commercial-scale catalytic hydrodesulfurization (CHD) process shown schematically in FIG. 1, each of two separate streams of a sulfur-containing liquid hydrocarbon feed is passed through a preheat furnace and is thereafter combined with recycle and/or fresh hydrogen prior to entering a fixed bed two-phase downflow CHD reactor in which hydrodesulfurization occurs. The combined effluent from each CHD reactor passes through a heat exchanger giving up a portion of its thermal energy to recycle hydrogen recovered from a series of gas-liquid separators. The hydrodesulfurized product recovered from the gas-liquid separators is then further processed in a stripper unit with a naptha fraction being recovered as overheads and a heavier desulfurized product being recovered as bottoms.

Figure 2:
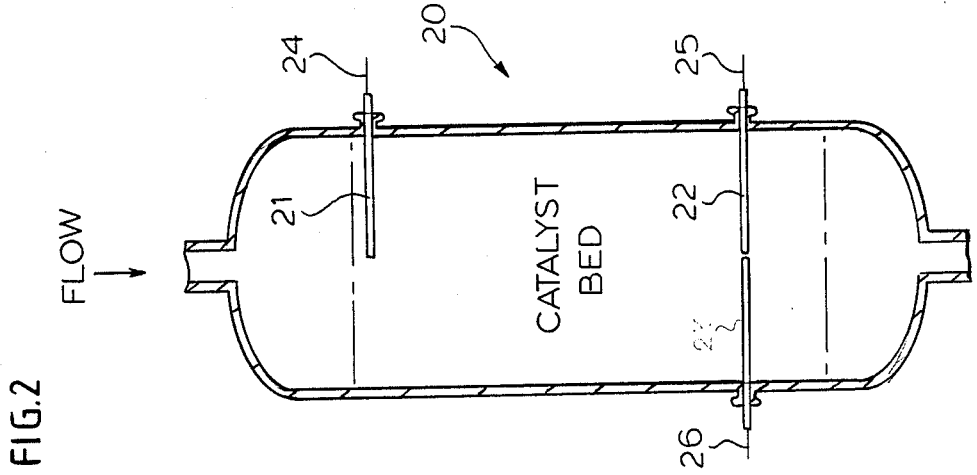
FIG. 2 is a simplified sectional view of one of the pairs of reactors of FIG. 1 showing the placement of heated thermocouple probes to measure the total thermal mass flux in each zone of the reactor associated therewith.

One of these CHD reactors, indicated generally at 20, is shown in simplified sectional view in FIG. 2 with three heated thermocouple probes, or simply "probes", 21, 22 and 23 associated with upper and lower zones of the reactor, respectively. Top probe 21 is positioned below the top of the catalyst bed, the center of the probe being suspended from the distributor tray (not shown). Bottom probes 22 and 23 are placed directly opposite each other with their tips meeting in the center of the reactor. Each of the probes is made up of several equidistant thermocouples, e.g., seven, and each probe is connected to a temperature recorder, 24, 25, 26.

FIG. 3 shows a representative section of a heated thermocouple probe which is especially adapted for installation in the CHD reactor of FIG. 2.

Figure 4:
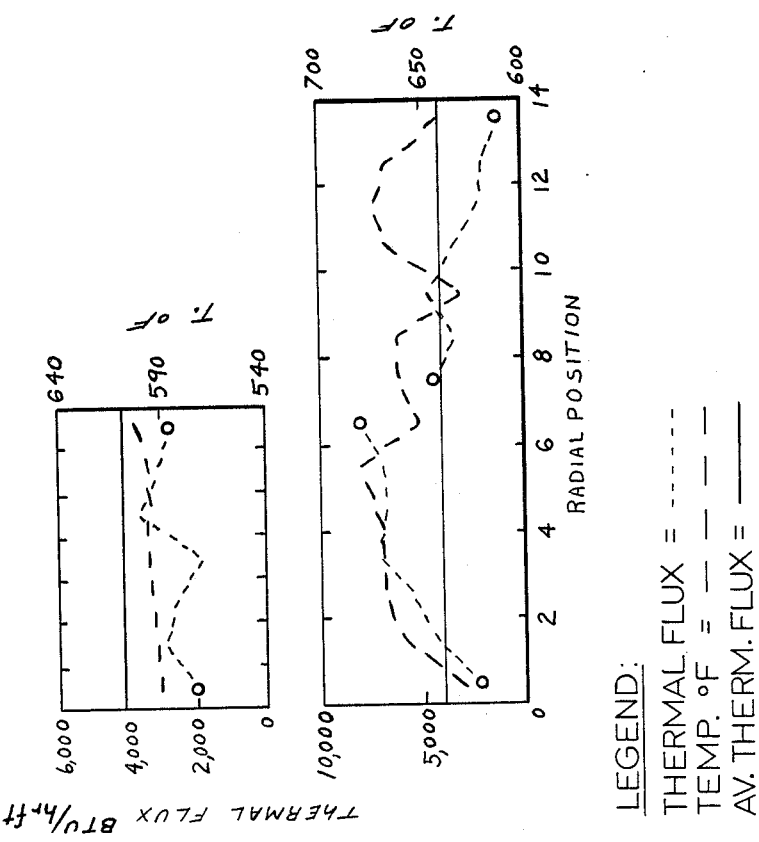
FIG. 4 shows thermal mass flux profiles calculated with temperature measurement data taken in accordance with the invention.

In the data plotted in FIG. 4 which were obtained in a test run in the unit of FIG. 1, overall thermal mass flux (TMF) was calculated in accordance with the equations $$h = Q/A(\Delta T) \quad (1)$$

in which h is the heat transfer coefficient, Q is the heat transfer rate (uniform over a probe), A is the cross-sectional area of the reactor and ($\Delta T$) is the measured difference in temperature on heating, and $$TMF = (h/1.016)^2 D_p/k_e \quad (2)$$

in which $D_p$ is the probe diameter and $k_e$ is the effective thermal conductivity of the catalyst bed.

A typical set of probe data is shown in FIG. 4. This Figure shows the radial distribution of thermal flux (in Btu/hr/ft$^2$/°F.) over the probes in relation to the bed average value (solid horizontal lines). Probe values terminate with circles on either end of a given probe profile. Also shown in this figure are reactor-radial temperature profiles. The profiles are shown connected with line segments although data are taken only at one foot intervals.

The use of a heated thermocouple probe was also evaluated in two types of laboratory units; a cold flow 20" diameter unit using air and water and a 4" diameter CHD reactor using hydrogen and fuel oil and similar in operating principle to the commercial unit described in connection with FIG. 1. A single point heated thermocouple probe was used in both units. A typical response curve for the thermocouple temperature measurement immediately after the heater is turned on is shown in FIG. 5. In these laboratory units, the gas and liquid flow rates can be made to be uniform throughout the reactor cross-section and these are related to the temperature measurements of the probe before and after supplying heat.

Figure 6:
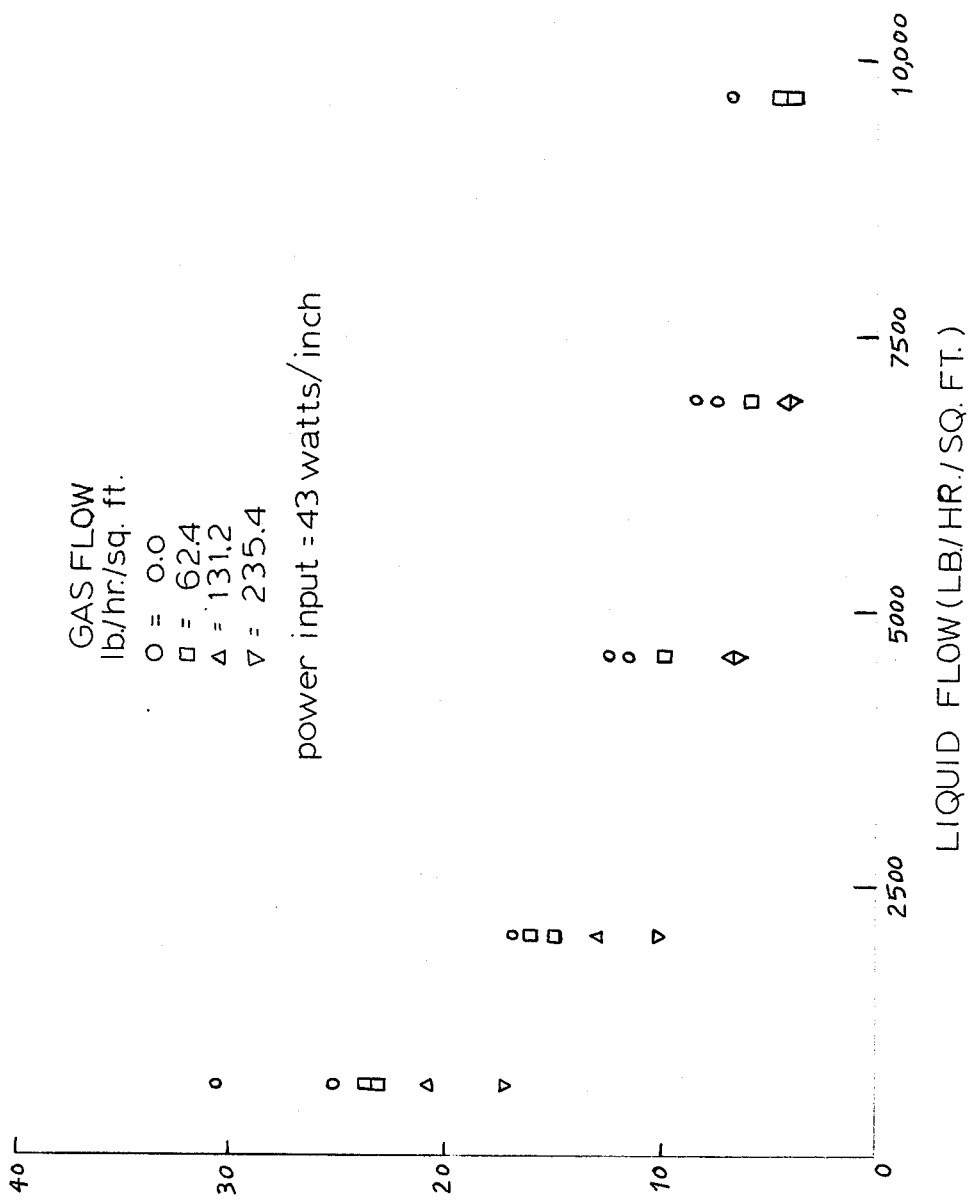
FIG. 6 is a curve showing temperature rise after supplying a constant heat input rate to a heated thermocouple probe as a function of gas (air) and liquid (water) flow rates within a cold flow vessel; and, FIG. 7 graphically depicts the method of determining local conditions of gas and liquid flow rates at the probe.
Figure 7:
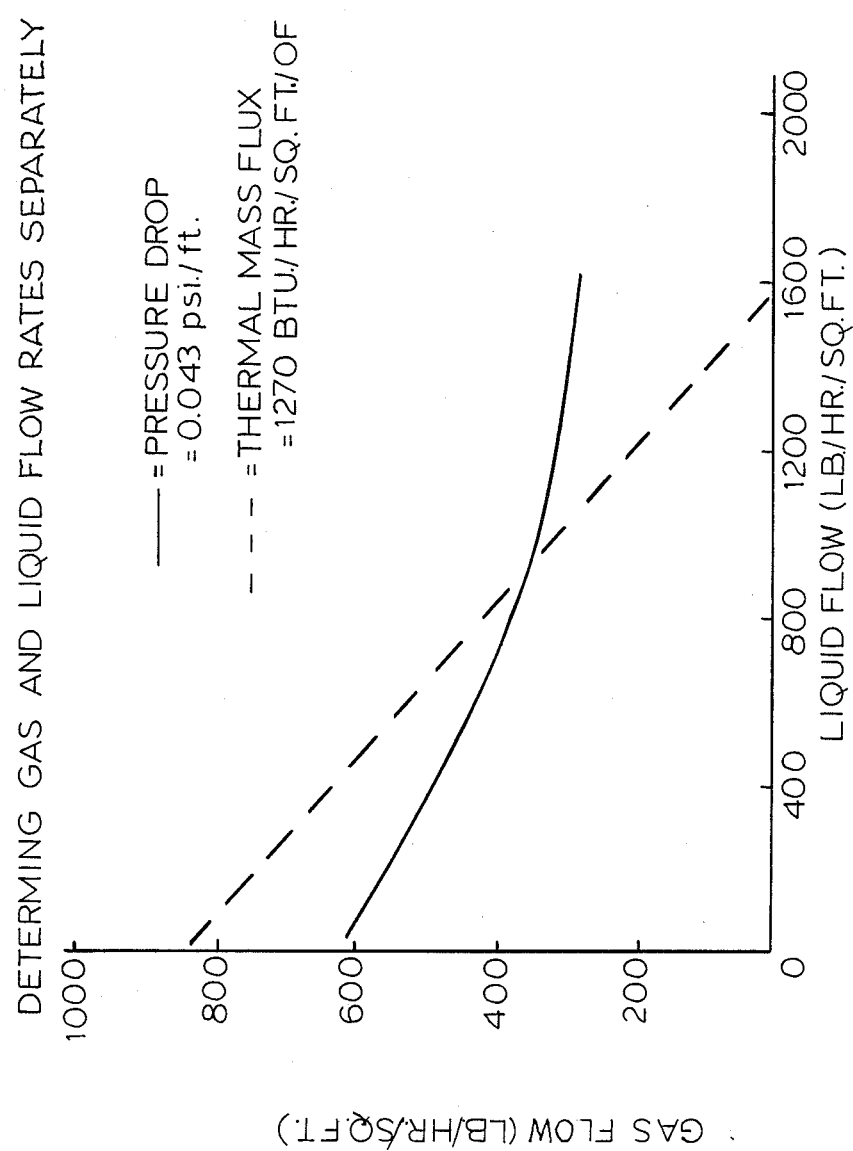

A typical set of data showing temperature rise as a function of air and water flow rates is shown in FIG. 6. From this figure, it is seen that at a constant liquid flow rates, increasing gas flow rates reduces the temperature rise and that at constant gas flow, increasing liquid flow also reduces the temperature rise. Two temperature readings give an indication of the total thermal mass flux. In actuality, a heat transfer coefficient is calculated in accordance with the temperature readings and the thermal flux is inferred from the heat transfer coefficient. Any number of combinations of gas and liquid flow rates would add up to the thermal mass flux measured. This data along with bed pressure drop data can be combined with well-known pressure drop correlations to determine these flow rates separately, e.g., the correlation of Larkins et al. *AIChE J.*, 7, 231 (1961) can be used. It depends on physical properties of the system, and pressure drop increases with increasing gas or liquid flow. FIG. 7 shows use of this correlation in the present method using data taken in the 4" CHD reactor. For this case, thermal mass flux was determined to be 1270 Btu/hr/ft.$^2$/°F. based on probe data. The figure shows the range of combinations of gas and liquid flow rates which add to this thermal mass flux value. The actual combination also satisfies the bed pressure drop of 0.043 psi/ft.

In practice, a probe will have several thermocouples along its length to provide flux measurements at several points; therefore, spatial distribution of gas and liquid flow can be inferred in a bed packed with catalyst particles. The nonuniform radial thermal flux meaurements at any given horizontal location in the reactor in itself indicates maldistribution of gas-liquid flow in the reactor. The additional information of specific gas and liquid distribution can be found using the method described above.

The probes with their assembled thermocouples are well able to withstand the reaction environment yet sensitive enough to detect fluid flow maldistribution in the reactor. Use of multiple probes at various heights will detect fluid maldistribution in the catalyst bed which might arise from poor distributor tray performance or the flow regime in which the reactor operates.

Although the method of this invention has been illustrated in connection with two-phase flow units, in particular, a catalytic hydrodesulfurization unit, it shall be understood to apply to all types of chemical processing equipment and chemical processes including, without limitation, apparatus for carrying out catalytic cracking, dehydrogenation of hydrocarbon compounds, converting paraffins to aromatics, converting olefins to aromatics, converting alcohols and/or ethers to hydrocarbons, isomerizing xylene, disproportionating toluene, alkylating aromatic hydrocarbons, transalkylating aromatic hydrocarbons, dewaxing various hydrocarbon feeds, etc., and apparatus for carrying out physical processes such as distillation, extraction, absorbtion, desorbtion and other types of separations.

We claim:

1. A method for measuring local fluid flow rates in a vessel which comprises:
    (a) arranging a plurality of probes in the vessel at two or more longitudinally spaced locations along the path of the fluid flow therethrough, each of said probes includes a heater well, a heater and at least one thermocouple;
    (b) obtaining a first set of temperature readings with the probe heaters off to provide the local vessel temperature;
    (c) obtaining a second set of temperature readings with the probe heaters on to provide a skin temperature of the heater well;
    (d) using the difference between readings (b) and (c) to calculate the fluid flow rates.

2. The method of claim 1 wherein the vessel is a reactor for carrying out a chemical conversion.

3. The method of claim 2 wherein the reactor is one employed in carrying out catalytic cracking, hydrotreating, hydrocracking, dehydrogenation, conversion of paraffins to aromatics, conversion of olefins to aromatics, conversion of alcohols and/or ethers to hydrocarbons, isomerization of xylene, alkylation of aromatic hydrocarbons, transalkylation of aromatic hydrocarbons, dewaxing or hydrocarbon feeds or hydrodesulfurization.

4. The method of claim 1 wherein the vessel is one used for carrying out a physical process.

5. The method of claim 4 wherein the vessel is a separating unit.

6. The method of claim 5 wherein the vessel is a distillation column, extraction column, absorber or desorber.

7. The method of claim 1 wherein each probe possesses a plurality of thermocouples arranged along its length.

8. A method for measuring total gas and liquid flow rates in a fixed bed reactor which comprises:
    (a) arranging a plurality of probes in the vessel at two or more longitudinally spaced locations along the path of fluid flow therethrough each of said probes includes a heater well, a heater and at least one thermocouple;
    (b) obtaining a first set of temperature readings with the probe heaters off to provide the local reactor temperature;
    (c) obtaining a second set of temperature readings with the probe heaters on to provide a skin temperature of the heater well; and,
    (d) calculating total thermal mass flux TMF to provide total gas and liquid flow rates in accordance with the equation $$TMF = (h/1.016)^2 Dp/Ke$$

in which heat transfer coefficient h is calculated in accordance with the equation $$h = Q/A(\Delta T)$$

where Q is the heat transfer rate, A is the cross-sectional area of the reactor and $\Delta T$ is the measured difference in temperature between the two sets of temperature readings obtained in steps (b) and (c), Dp is the probe diameter and $K_c$ is the effective thermal conductivity of the fixed bed reactor.

9. The method of claim 8 wherein the individual gas and fluid flow rates are calculated from the thermal mass flux correlated with observed pressure drop across the fixed bed reactor.

10. The method of claim 8 wherein the reactor is one employed in carrying out catalytic cracking, hydrotreating, hydrocracking, dehydrogenation, conversion of paraffins to aromatics, conversion of olefins to aromatics, conversion of alcohols and/or ethers to hydrocarbons, isomerization of xylene, alkylation of aromatic hydrocarbons, transalkylation of aromatic hydrocarbons, dewaxing of hydrocarbon feeds or hydrodesulfurization.

* * * * *